United States Patent [19]

Jackson et al.

[11] Patent Number: 4,969,995
[45] Date of Patent: Nov. 13, 1990

[54] REMOVAL OF METAL IONS FROM AQUEOUS SOLUTION

[75] Inventors: Paul J. Jackson; Emmanuel Delhaize, both Los Alamos, N. Mex.; Nigel J. Robinson, Durham, England; Clifford J. Unkefer, Los Alamos, N. Mex.; Clement Furlong, Seattle, Wash.

[73] Assignee: The United States of America as represented by the United States Department of Energy, Washington, D.C.

[21] Appl. No.: 451,860

[22] Filed: Dec. 18, 1989

Related U.S. Application Data

[62] Division of Ser. No. 237,263, Aug. 26, 1988, Pat. No. 4,909,944.

[51] Int. Cl.$^5$ .............................................. B01D 15/08
[52] U.S. Cl. .............................. 210/263; 210/502.1; 502/402
[58] Field of Search ............... 210/656, 673, 674, 679, 210/688, 912–914, 198.2, 198.3, 264, 263, 266, 275, 282, 287, 291, 501, 502.1, 506; 530/326; 502/401–404, 439

[56] References Cited

U.S. PATENT DOCUMENTS

| | | | |
|---|---|---|---|
| 3,948,863 | 4/1976 | Akamatsu et al. | 210/688 |
| 4,125,519 | 11/1978 | Goodman et al. | 210/688 |
| 4,431,546 | 2/1984 | Hughes et al. | 210/502.1 |
| 4,675,104 | 6/1987 | Rai et al. | 210/502.1 |
| 4,725,670 | 2/1988 | Grill et al. | 530/326 |
| 4,732,887 | 3/1988 | Obanawa et al. | 210/679 |

OTHER PUBLICATIONS

Erwin Grill et al., "Phytochelatins: The Principal Heavy-Metal Complexing Peptides of Higher Plants," *Science* 230, 674–676 (Nov. 1985).

Erwin Grill et al., "Phytochelatins: A Class of Heavy-Metal-Binding Peptides from Plants, are Functionally Analogous to Metallothioneins," *Proceedings of National Acacemy of Science U.S.A.*, 84, pp. 439–443 (1987).

*Primary Examiner*—Tom Wyse
*Attorney, Agent, or Firm*—Richard J. Cordovano; Paul D. Gaetjens; William R. Moser

[57] ABSTRACT

A method of removing heavy metals from aqueous solution, a composition of matter used in effecting said removal, and apparatus used in effecting said removal. One or more of the polypeptides, poly ($\gamma$-glutamylcysteinyl)glycines, is immobilized on an inert material in particulate form. Upon contact with an aqueous solution containing heavy metals, the polypeptides sequester the metals, removing them from the solution. There is selectivity of poly ($\gamma$-glutamylcysteinyl)glycines having a particular number of monomer repeat unit for particular metals. The polypeptides are easily regenerated by contact with a small amount of an organic acid, so that they can be used again to remove heayv metals from solution. This also results in the removal of the metals from the column in a concentrated form.

9 Claims, 1 Drawing Sheet

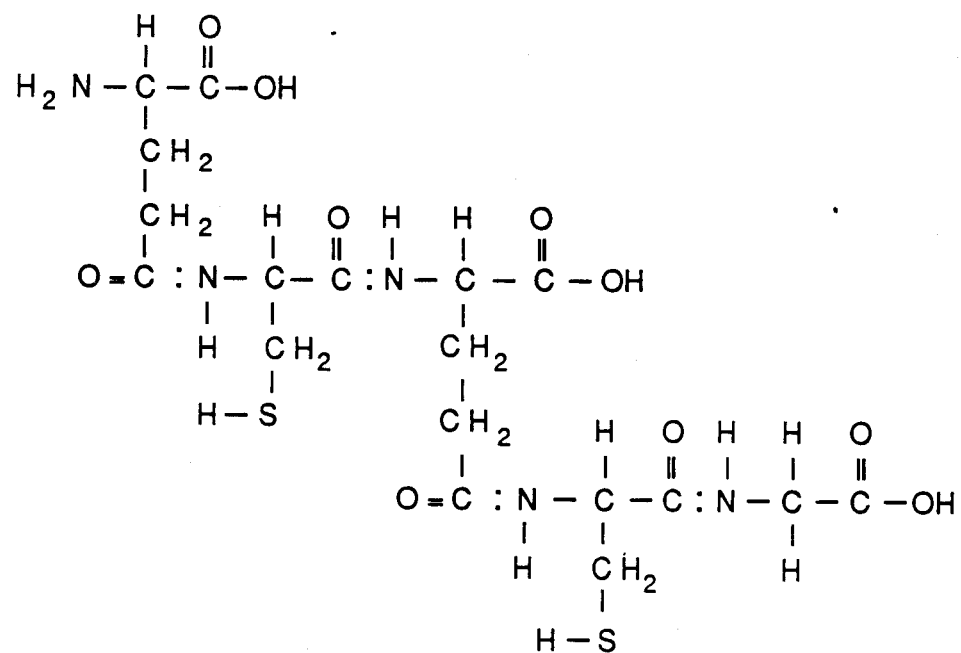

REMOVAL OF METAL IONS FROM AQUEOUS SOLUTION

This is a division of application Ser. No. 07/237,263 filed 08/26/88, now U.S. Pat. No. 4,909,944.

BACKGROUND OF THE INVENTION

This invention relates to biochemistry and environmental protection. This invention is the result of a contract with the Department of Energy (Contract No. W-7405-ENG-36).

Waste streams containing heavy metals, such as cadmium and copper are generated in many industrial operations. The metals are toxic to animal and plant life and must be removed before the waste streams are discharged into the environment. Also, there are many sites where water containing heavy toxic metals has been dumped these sites must be cleaned up or, at minimum, the sites must be stabilized to prevent the waste from migrating to contaminate more of the environment.

Cadmium is an example of a toxic metal which must be excluded from the environment, it accumulates readily in living systems and, in humans, has been implicated as the cause of renal disturbances, lung insufficiency, bone lesions, hypertension, and cancer. The U.S. Environmental Protection Agency limits the amount of cadmium which may be present in drinking water to 10 parts per billion. Cadmium containing waste streams are generated in such industrial operations as zinc refining, battery manufacturing, electroplating, and pigment manufacturing.

BRIEF DESCRIPTION OF THE INVENTION

This invention is a method of removing heavy metals from aqueous solution, a composition of matter used in effecting said removal, and apparatus used in effecting said removal. One or more of the polypeptides, poly ($\gamma$-glutamylcysteinyl)glycines is immobilized on an inert material in particulate form. Upon contact with an aqueous solution containing heavy metals, the polypeptides sequester the metals, removing them from the solution. There is selectivity of poly ($\gamma$-glutamylcysteinyl)glycines having a particular number of monomer repeat units for particular metals. The polypeptides are easily regenerated by contact with a small amount of an organic acid, so that they can be used again to remove heavy metals from solution. This also results in the removal of the metals from the column in a concentrated form.

In a broad embodiment, the present invention is a method of removing heavy metals from an aqueous solution comprising contacting an aqueous solution with a solid substance comprised of water-insoluble polymeric material to which is attached molecules of poly ($\gamma$-glutamylcysteinyl)glycines for a time period effective for metals to become attached to said poly ($\gamma$-glutamylcysteinyl)glycines and separating said aqueous solution which is depleted of metals from said solid substance.

BRIEF DESCRIPTION OF THE DRAWING

The drawing shows the structural formula of a poly ($\gamma$-glutamylcysteinyl)glycine having two monomer repeat units.

DETAILED DESCRIPTION OF THE INVENTION

Poly ($\gamma$-glutamylcysteinyl)glycine molecule of this invention is a polypeptide which consists of a chain of monomer repeat units having the amino acid glycine attached to it. Each monomer repeat unit consists of two amino acids, glutamate and cysteine, joined by a peptide, or gamma, bond. The poly ($\gamma$-glutamylcysteinyl)glycines are frequently represented by (Glu-Cys)nGl, where n is equal to the number of monomer repeat units. In experimentation associated with this invention. Poly ($\gamma$-glutamylcysteinyl)glycines having 2, 3, 4, and 5 repeat units have been produced and it is expected that the number of repeat units which may be utilized in the practice of this invention will range up to 10 or more.

The poly ($\gamma$-glutamylcysteinyl)glycines of this invention have an affinity for the heavy toxic metals cadmium, copper, and zinc and will combine with these metals in water solution. In addition to these three metals, which have been the subject of experimentation, it is expected that poly ($\gamma$-glutamylcysteinyl)glycines will also have an affinity for lead, mercury, and nickel. Certain poly ($\gamma$-glutamylcysteinyl)glycines are selective for particular metals. It has been demonstrated by experimentation that the poly ($\gamma$-glutamylcysteinyl)glycine having two repeat units will tend to sequester cadmium in preference to the other metals. Also, the compound having three repeat units favors copper. It is expected that additional selectivities exist, such that knowledge of the aqueous stream to be treated will allow a particular poly ($\gamma$-glutamylcysteinyl)glycine to be selected. If two metals are to be removed, two or more poly ($\gamma$-glutamylcysteinyl)glycines may be used. On the other hand, it may be desirable to remove only one metal from a stream containing two or more metals. In this case the poly ($\gamma$-glutamylcysteinyl)glycine which is selective for that metal would be used.

Since the poly ($\gamma$-glutamylcysteinyl)glycines are soluble in water, they must be immobilized, or made insoluble. This is done by attaching the poly ($\gamma$-glutamylcysteinyl)glycine molecules to an inert polymeric material, Which is usually in the form of beads, which may range from 0.01 to 20 mm or more in diameter. Any relatively inert polymer which has chemical sites to which will attach the free amino group of the glutamate group on one end of the chain may be used. A polysaccharide has been used in the experimentation.

The solid substance consisting of the polymeric material with the poly ($\gamma$-glutamylcysteinyl)glycines attached is placed in a container such as an elongated vertical cylindrical vessel and the aqueous metal-containing solution is allowed to flow through the solid substance by gravity. When the solid substance has reached its capacity to absorb metals, it is regenerated, that is. Prepared for reuse in removing metals, by passing a small quantity of a high molecular weight organic acid through it. For example, 3 ml of oxalic acid was sufficient to regenerate a column which had removed metals from 1000 ml of solution. Large organic oxides having a low pH and weak chelating properties such as citric acid and maleic acid, may be used.

The polypeptides of this invention may, conceivably, be prepared by chemical means, but are most advantageously prepared by culturing certain substances in the presence of a heavy metal. Though a particular metal is used to stimulate production of poly ($\gamma$-glutamylcysteinyl)glycines, the material produced has affinities for other metals, as described above.

The following paragraphs describe a portion of the experimentation which was accomplished.

Suspension cell cultures of Datura innoxia have been selected for resistance to different concentrations of $CdCl_2$ using a stepwise selection protocol. Variant cell lines retain the ability to grow in normally toxic concentrations ⓒi Cd after growth in its absence for more than seven hundred generations. Resistance to Cd correlates with synthesis of large amounts of small cysteine-rich Cd complexes.

Cadmium tolerant Datura innoxia cell cultures are grown in a standard plant cell culture media containing 250 $\mu$M $CdCl_2$ for at least 48 hours, with shaking at 30° C. Growth under these conditions results in the synthesis of large amounts of poly($\gamma$-glutamylcysteinyl)glycines, which accumulate within the cells.

To extract the polypeptides, the cells are washed once in an ice-cold buffer containing 10 mM Tris-HCl, pH 7.4, 10 mM KCl, 1.5 mM $MgCl_2$ and 20 mM 2-mercaptoethanol. Cells are collected from the buffer by centrifugation at low speed for 10 minutes, resuspended in the same buffer, and broken open with a homogenizer. The resulting extract is centrifuged for 15 minutes at 15,000$\times$g to remove insoluble material and the resulting supernatant is passed through a Sephadex G-50 (fine) column, which separates the polypeptides from the majority of the remaining cellular material. Fractions collected from the column which contain the polypeptides are identified by the presence of bound cadmium. These fractions are pooled and the polypeptides are washed and concentrated by ultrafiltration. The resulting preparation is used as a source of poly($\gamma$-glutamylcysteinyl)glycines to be attached to Sepharose beads.

The amount of polypeptide present is determined by assaying for the amount of sulfhydry groups present using an Ellman's reaction. Sepharose 4B (Sigma Chemical Co., St. Louis, Mo.) is washed in a large excess of triple distilled water. The hydrated Sepharose is then suspended in an equal volume of 5 M potassium phosphate solution and chilled on ice. 0.4 volumes of a solution containing 100 mg/ml CNBr (cyanogen bromide) in distilled water is added dropwise over a period of two minutes. The suspension is shaken gently during the addition of the CNBr and is allowed to react for eight minutes on ice.

The CNBr-activated Sepharose is then washed with five volumes of a solution containing 0.25 M $NaHCO_3$, pH 9.0.

The CNBr-activated SePharose is then mixed with a solution containing a known quantity of poly($\gamma$-glutamylcysteinyl)glycine. This suspension is allowed to react overnight at room temperature.

The above suspension is then poured into a glass or plastic column containing a glass frit in the bottom which allows passage of liquid but not the metal-binding matrix. As the liquid drips from the column (it can be removed using gravity flow or by pumping). the matrix is washed by addition of at least five volumes of solution containing 0.25 M $NaHCO_3$, pH 9.0. This is followed by washing the column with five volumes of the same solution containing 1 M NaCl and five volumes of a solution containing 1 M ethanolamine, pH 9.0 (pH adjusted with HCl), The column can be stored in this latter solution, then washed again with 0.25 M $NaHCO_3$, followed by distilled water.

The column is then washed with five volumes of a solution containing 0.1 M oxalic acid. This removes the cadmium which was bound by the polypeptides while the polypeptides were still within the cells. It also frees the binding sites of the polypeptides for binding more metal ion.

A stock solution containing 5 $\mu$M $CdCl_2$ containing a small amount of radioactive $^{109}$Cd is passed through the column and fractions are collected from the bottom of the column and assayed for the presence of the radioactive cadmium. No radioactive cadmium can be detected until all of the metal-binding sites on t he column are saturated. Knowledge of the specific activity of the cadmium solution allows determination of the amount of cadmium bound by a specific batch of metal-binding matrix. Cadmium bound to the column is removed by again washing the column with a small volume of a solution containing 0.1 M oxalic acid. This wash releases the cadmium ion from the column in a concentrated solution and results in the regeneration of cadmium binding sites on the column. The end result is a significant concentration of the cadmium from the beginning aqueous solution.

The polypeptides were first identified by their ability to bind radioactive cadmium. Extracts from Cd-tolerant Datura innoxia cells were passed through a Sephadex G-50 column which separates molecules based primarily on size. Fractions from the columns were assayed for cadmium and it was found that certain fractions contained greater than 90% of the cadmium known to be within the cells. These fractions were collected and further purified by affinity chromatography on Thiopropyl Sepharose 6B, which binds compounds which are rich in cysteine (we knew from amino acid labeling experiments that cysteine was one of the malor components of the cadmium binding fractions). It was found that the components of the fractions contained only three different amino acids (by amino acid analysis of the purified material); cysteine, glutamate and glycine in a ratio close to 3:3:1. We attempted to sequence the polypeptides using Edman degradation, but this did not result in the degradation of the polypeptides, suggesting that either the peptide bonds were blocked or were not linked to one another via the $\alpha$-carboxyl group. We sequenced the polypeptides using a combination of enzymatic degradation of the polypeptides, starting from the carboxyl end. The presence of $\gamma$-carboxamide linkages was first suggested by the stability of the polypeptides to Edman degradation and was confirmed by $^{13}$C NMR.

Experimentation was conducted at ambient temperatures, but the polypeptides are stable over a temperature range of at least 4° to 85° C. Selectivity of the polypeptides may vary with temperature; this would be useful in designing a commercial process. The Sepharose used in the experiments had a hydrated size of from 60 to 140 microns.

TABLE

| Cd concentration, micromolar | Bound Cd, moles Cd/mole polypeptide |
|---|---|
| 1 | 0.2 |
| 5 | 1.41 |
| 20 | 1.66 |
| 47.5 | 1.91 |
| 100 | 2.01 |

The Table shows the results of a series of experiments in which aqueous solutions having varying Cd concentrations were passed through a column 2.5 cm I.D. ×20 cm long containing an estimated 12.45 mg of poly (γ-glutamylcysteinyl)glycines on Sepharose. The column was regenerated after each of the 5 solutions was passed through it. A small amount of radioactive Cd was present in each solution in order to determine the total amount of Cd bound by the column. It can be seen that the Cd capacity of the column was dependent on the concentration of Cd in the solution.

What is claimed is:

1. Apparatus for removing metals from aqueous solution comprised of:
   a. a vertically positioned elongated cylindrical vessel;
   b. water-insoluble polymeric material in the form of discrete particles located inside said vessel, where said polymeric material has attached to it molecules of poly(γ-glutamylcysteinyl)glycines;
   c. means for supplying a metal-containing aqueous solution to the top of said vessel;
   d. means for distributing said aqueous solution over the horizontal area of said polymeric material at the top of said vessel; and
   e. means for collecting said aqueous solution, which is depleted of metals, at the bottom of said vessel.

2. The apparatus of claim 1, where the molecular weight of the particular poly(γglutamylcysteinyl)glycine used in said apparatus is established by reference to which particular metal is to be removed from said aqueous solution.

3. The apparatus of claim 1, where the number of monomer repeat units of said poly(γ-glutamylcysteinyl)glycine is from 2 to about 10.

4. The apparatus of claim 1, where said metals are cadmium, copper, zinc, mercury, lead, and nickel.

5. The apparatus of claim 1, where said polymeric material is in the form of spheres having a diameter ranging from about 0.01 to about 20 mm.

6. The apparatus of claim 1, where said polymeric material is a polysaccharide.

7. The apparatus of claim 1, where said poly(γ-glutamylcysteinyl)glycine molecules have substantially the same molecular weight.

8. The apparatus of claim 1, where the number of monomer repeat units of said poly(γ-glutamylcysteinyl)glycine is two and the metal to be removed from said aqueous solution is cadmium.

9. The apparatus of claim 1, where the number of monomer repeat units of said poly(γ-glutamylcysteinyl)glycine is three and the metal to be removed from said aqueous solution is copper.

* * * * *